3,473,337
MOBILE UNDERWATER POWER PLANT
William J. Carter, Jr., Williamsville, N.Y., assignor to Aro of Buffalo Incorporated, Buffalo, N.Y., a corporation of Ohio
Filed June 4, 1968, Ser. No. 738,766
Int. Cl. B63c *11/42;* B63g *8/08*
U.S. Cl. 61—69                                              12 Claims

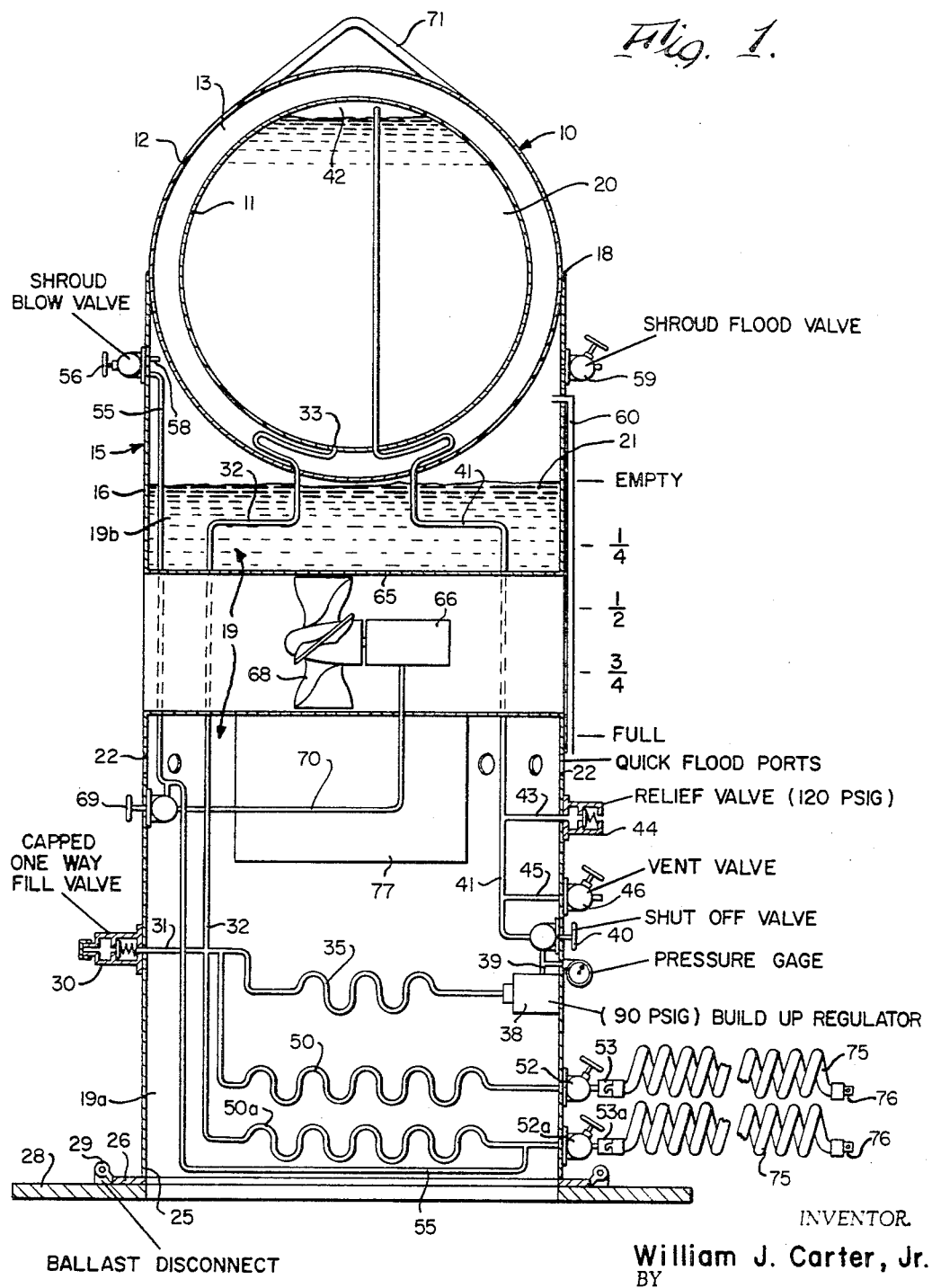

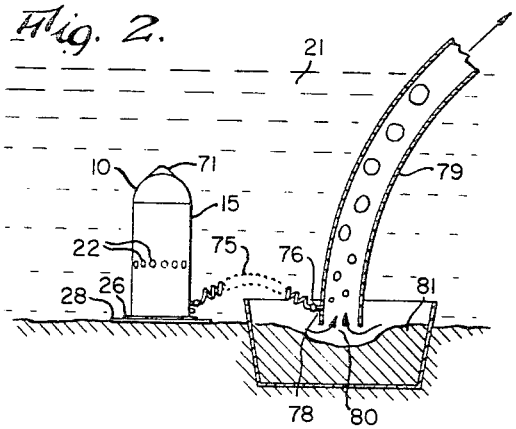
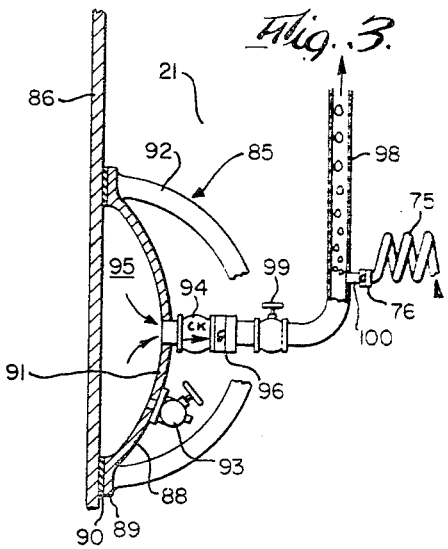
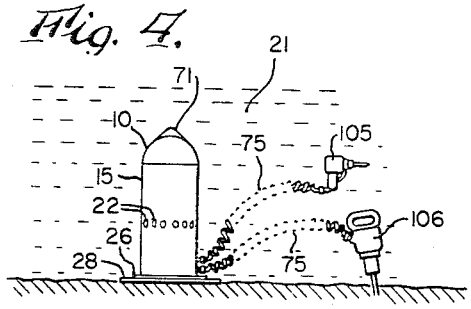
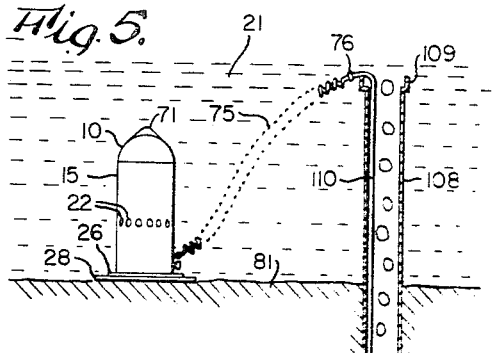
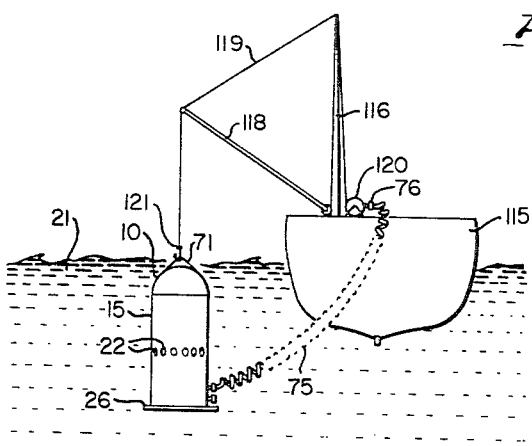
INVENTOR.
William J. Carter, Jr.
BY Sommer & Weber
ATTORNEYS United States Patent Office 3,473,337
Patented Oct. 21, 1969

ABSTRACT OF THE DISCLOSURE

For the operation of a wide variety of pneumatic tools, or tools requiring special gases such as in oxy-arc cutting, as well as for breathing purposes, a Dewar bottle containing a body of liquefied gas is carried by a submersible holder which also has a buildup coil and one or more vaporizing coils heated by the sea water and respectively serving to pressurize the Dewar bottle and to provide pressurized gas for such use. The holder also has a ballast compartment which is flooded to descend or blown out to rise and is provided with a pneumatically driven propeller for travel horizontally. The ballast compartment is open to the sea at its bottom and provided with a gage for the water level therein so that at neutral buoyancy this gage serves to indicate the degree of fill of the Dewar bottle. The pressurized gas can also be used to produce suction at the bottom of a submerged open top tube and the suction employed in a wide variety of underwater uses.

In the accompanying drawings FIG. 1 is a vertical longitudinal section through the mobile underwater plant, the piping and coils being shown diagrammatically. FIG. 2 is a diminutive side elevational view thereof and showing it operating a suction cleaner for removing silt and stones from the bottom of a body of water. FIG. 3 is an enlarged section through a tool being operated by the apparatus, this tool being in the form of a suction plate being adhered to the submerged side of a vessel for the purpose of providing a handhold for the diver. FIG. 4 is a view similar to FIG. 2 showing the apparatus used to operate a pneumatic drill and a pneumatic chipping hammer. FIG. 5 is a view similar to FIGS. 2 and 4 showing the apparatus used to drive a pile into the bottom of a body of water. FIG. 6 is a view similar to FIGS. 2, 4 and 5 and showing the power plant used to hoist itself out of the water.

Referring to the apparatus as shown in FIG. 1, the numeral 10 designates a spherical Dewar bottle having an inner shell 11 and a metal jacket shell 12 spaced therefrom to provide an insulation space 13 which can be evacuated and which can also contain conventional reflective insulation (not shown). This Dewar bottle is carried by a holder indicated generally at 15 and which is shown as comprising an upright cylinder tube or skirt 16 having its upper edge 18 embracing and welded to the periphery of the outer shell 12 of the Dewar bottle 10. The space 19 within the tube or skirt 16 houses the apparatus for converting a body 20 of liquefied gas in the Dewar bottle 10 into the form of a pressurized gas useful for driving pneumatic tools, for breathing purposes or for creating a suction. This conversion is achieved through the use of the sea water 21 as a heat sink and both to quickly flood the bottom 19a of the chamber 19 and also to provide circulation of the sea water therethrough, the tube or skirt 16 can be provided centrally of its height with an annular series of quick flood ports 22. Above these quick flood ports 22 the upper portion 19b of the chamber 19 is a buoyancy chamber of bell form, open at its bottom and closed at its top, and capable of being flooded or filled with gas to any desired degree depending upon whether the apparatus is being submerged, surfaced, or held at neutral buoyancy, as hereinafter described. The lower end of the support 15 is open, as indicated at 25, and is shown as having attached thereto a ring 26 to which a heavy metal ballast ring 28 is detachably secured in any suitable manner, as by disconnects 29.

The Dewar bottle 10 is initially filled or charged with the body 20 of liquefied gas, the conversion of which into a pressurized gas phase provides the power for operating various pneumatic tools. This body 20 of liquefied gas can also be used to supply air for breathing by the diver, in which event the body 20 would be liquid air. Liquid nitrogen can be used in the Dewar bottle 10, especially where an inert gas is desired. Liquid oxygen can be used for the body 20 for submarine oxy-arc cutting and also to provide an increased length of submerged service of the apparatus, oxygen being heavier than nitrogen or liquid air.

The Dewar bottle 10 can be filled from a capped check valve 30 secured to the exterior of the support or skirt 16 and connecting with a fill line 31 leading to a liquefied gas line 32 the upper end of which communicates with the bottom of the inner shell 11 of the Dewar bottle 10 as indicated at 33. This liquefied gas line 32, with a reversed flow, also delivers liquefied gas to a pressure buildup coil 35 which is in the bottom part 19a of the chamber 19 and hence in heat exchange relation with the sea water 21 in which the apparatus is submerged in use and which fills the space 19a below the quick flood ports 22. The outlet of the pressure buildup coil connects through a buildup regulator 38, line 39 and shutoff valve 40 with a gas pressure buildup line 41 leading to the gas head 42 in the top of the Dewar bottle 10. This pressure buildup line has a branch 43 to a relief valve 44 and another branch 45 to a vent valve 46.

The liquefied gas line 32 also delivers liquid gas to a pair of vaporizing coils 50, 50a each of which is immersed in the sea water 21 contained in the flooded bottom part 19a of the chamber 19, the liquid passing through these vaporizing coils being converted by heat exchange with the heat of the sea water into gaseous form and being under the pressure of the gas head 42. The outlet of the vaporizing coil 50 connects through a shutoff valve 52 with a quick disconnect 53 and the outlet of the vaporizing coil 50a connects through a shutoff valve 52a with a quick disconnect 53a. Also the outlet of the vaporizing coil 50a is connected by a line 55 to a manually controlled blow valve 56, the outlet 58 of which discharges into the buoyancy compartment formed by the top part 19b of the chamber 19. To permit flooding this buoyancy compartment 19b with sea water a shroud flood valve 59 is provided.

Means are also provided for showing the extent of fill of the body 20 of liquefied gas in the Dewar bottle 10. For this purpose a vertical transparent tube 60 is suitably secured to the exterior side of the support or skirt 16 above the quick flood ports 22. This gage tube is open at its lower end, and at its upper end opens to the top of the buoyancy compartment 19b. This tube is calibrated for degrees of fill of the Dewar bottle 10 with liquid.

When it is desired to determine the remaining amount of cryogenic liquid 20 during submerged operation, the shroud blow valve 56 is opened to add gas to the buoyancy compartment 19b. This added gas displaces a weight of sea water 21 from the buoyancy compartment 19b equal to the total weight of the totally submerged unit. The level of the sea water 21 in the vertical tube 60 will be common to the level of the sea water 21 in the shroud or skirt 16. When the unit is neutrally buoyant (but still fully submerged) and the Dewar bottle 10 is full of liquid gas 20, the sea water level in the shroud 16 and the tube 60 will show at the full mark FULL. As the liquefied gas 20 is depleted the unit will weigh less and less sea water need be displaced from the shroud 16 in order to achieve neutral buoyancy. Thus, as the Dewar bottle 10 is depleted of its liquefied gas 20, the level of the sea water in the tube 61 will be less to attain neutral buoyancy until all the liquefied gas 20 is used. Conversely to normal liquid level indicators the full mark FULL will always be at a lower level than the empty mark EMPTY. The empty mark EMPTY will be common to the unit weight when empty. The relative location of the full mark FULL will vary with the density of the liquefied gas 20.

It is desirable to have the apparatus self-propelling in a horizontal direction so that the diver, in addition to being capable of rapid ascent and descent (by blowing gas or flooding the ballast compartment 19b) can rapidly move horizontally underwater at the site of activity. For this purpose a horizontal large diameter tube 65 is provided across the interior of the skirt or support 16, the opposite ends of this cross tube being open to the sea. In this cross tube is mounted a pneumatic motor 66 driving a propeller 68 which drives sea water in one direction through the horizontal cross tube 65. This hydraulic motor 66 is under control of a hand valve 69 in a line 70 leading from the pressurized gas line 55 to the pneumatic motor. When submerged, the diver can hold into the apparatus by means of a handle 71 at its top and, by opening the valve 69 supplies pressurized gas to the pneumatic motor 66 thereby to drive the propeller 68. This provides jet propulsion from the horizontal cross tube 65 in a corresponding horizontal direction, and by steering the apparatus the diver can propel himself and the apparatus to the side where the work is to be done.

Either or both of the disconnects 53 or 53a can be used to supply pressurized gas developed from the liquid body 20 for any purpose. For this purpose extensible flexible tubes 75, such as are now in common use as umbilicals in submarine work, can be employed. The other end of each of these flexible tubes 75 can be provided with a disconnect 76 for connection to any of various tools, as hereinafter described.

The support 15 can also house an electric battery 77 for attached or detachable lights (not shown).

Through the fill valve 30 the Dewar bottle 10 is filled with the body 20 of liquefied cryogenic gas, this liquid passing from this fill valve and through the lines 31 and 32 to the bottom of the inner shell 11 of the Dewar bottle. The power plant is then ready to be submerged into the sea water 21 to pressurize the Dewar bottle and to convert the liquid body 20 into pressurized gas, the sea being the heat sink.

To pressurize the Dewar bottle 10, part of the liquid from the body 20 flows via the line 32 into the buildup coil 35 which is externally heated by the sea water 21 in which it is immersed. Under control of the buildup regulator 38, the gas developed and pressurized in the buildup coil 35 is admitted via line 41 into the gas head 42 in the top of the Dewar bottle 10. This supplies the head pressure for the gas generated in the power plant.

This head pressure forces additional liquid from the body 20 through the line 32 into the vaporizing coils 50, 50a the exterior of which is exposed to the sea water 21 and hence heated thereby. In these vaporizing coils the liquefied gas is converted into its gas phase, this conversion also developing gas pressure. This pressurized gas is discharged through the extensible, flexible helical tubes 75 to serve a pneumatic tool and/or to be used for breathing purposes or oxy-arc cutting by the diver, as may be required.

In FIGS. 2–6 are illustrated various tools which the power plant as above described can be used to operate, these tools being described as follows:

Thus, illustrated in FIG. 2, one end of a flexible supply tube 75 can be connected by its disconnect 76 to a line 78 discharging into the bottom of a tube 79. This tube 79 is submerged in the sea water 21 and is open at its upper and lower ends. As the compressed gas is discharged from 78 into the bottom of the tube 79, it forms bubbles which rise and increase in size which will reduce the pressure in the tube 79 above the gas entry 78 and create a suction at the open bottom 80 of the tube. This draws sea water 21 and mud and stones from the bottom 81 of this body of water 21 into the tube 79 to move upwardly therethrough, propelled by the gas bubbles, and to be discharged from the open upper end thereof into a suitable receiver (not shown).

In FIG. 3 is indicated the manner in which suction grips or handholds 85 can be attached to a flat surface such as the underwater hull portion 86 of a ship. In working under water the diver suffers from the disadvantage that he has very little weight and hence without some sort of an anchorage is severely restricted in attempting to drill, saw or chip something, as an example. To avoid this it is possible with the present power plant to firmly adhere the suction handholds or grips to a relatively flat surface and the diver can brace his body against these in exerting the required thrust against a tool to make it effective.

Each handhold is shown as comprising a cup-shaped disk 88 having a rim 89 provided with a ring 90 of soft resilient plastic sealing material 90 which projects perpendicularly from the suction face 91 of the disk 88. The disk can be provided with a handle or grab 92 and is provided with a manual exhaust valve 93. A check valve 94 has its inlet end connected with the interior 95 of the suction disk and its exterior can be connected through a quick disconnect 96 with the lower valve end of an upright suction tube 98, the manual valve being indicated at 99. An inlet 100 at the lower end of the suction tube 98 is connected to the disconnect 76 at the end of an extensible suction line 75, as with the other tools described.

In use the pressurized gas discharged at 100 into the lower end of the suction tube 98 rises to form bubbles therein which rise and increases in size thereby to reduce the pressure in the tube above the gas entry 100, the bubbles passing out through the upper end of the tube. This creates a suction at the lower end of the suction tube 98 and by opening the hand valve 99 the space 95 is evacuated through the check valve 94. This causes suction adherence of the suction disk 88 to the submerged part of the hull 86 and the diver is free to turn off his suction valve 99 and separate the disconnect 96, the check valve 94 preventing loss of suction in the chamber 95. This operation can be repeated with a supply of handholds at as many locations along the hull 86 as may be desired, and when completed the diver has a series of grabs 92 which he can use for the purpose of applying thrust against his tools.

In FIG. 4 the disconnects 76 at the outboard ends of the helical flexible and extensible pressurized gas tubes 75 are shown as connected, respectively, to a pneumatic drill 105 and a pneumatic chipping hammer. With these tools the spent gases simply exhausts from the outlet of the tool into the sea water 21 without contamination thereof. With such tools, such as the drill 105, it is desirable to protect most of the parts against the action of sea water by coating the same with some protective material. However, where sliding parts are to be protected, as with the chuck of the drill 105, a band of sacrificial metal, such as magnesium, can be wrapped around the chuck so that the sea water attacks and eats away this sacrificial metal instead of the operating parts of the chuck.

In FIG. 5 is illustrated the manner in which the apparatus can be used to drive a pile 108 into the bottom 81 of the body of water 21. This pile is shown as being in the form of a straight open ended tube with a bell 109 at its upper submerged open end. The disconnect 76 of flexible pressurized gas line 75 is connected to the top of a tube 110 which extends downwardly through the bell 109 to the open bottom of the pile 108. The pressurized gas discharged from the lower open end of this tube 110 forms bubbles which rise and increase in size to reduce the pressure in the pile 108 above the gas entry at the bottom of tube 110 and create a suction which draws mud and stone from the bottom 81 up into the pile 108 to be discharged from the open upper end thereof. After the pile 108 has fallen down into the hole it has created, a second pile 108 can be placed on top thereof and the performance repeated. As a final operation the pile 108 can of course, be filled with concrete to provide a heavy and durable pile.

FIG. 6 illustrates the manner in which the apparatus can be used to hoist itself into and out of a boat 115. The boat is shown as equipped with a mast 116, boom 118 and hoist line 119 operated by a pneumatic motor driven winch 120 at the base of the mast 116. The apparatus is brought back to the ship by the diver using its self-propulsion feature, and its handle 71 caught on a hook 121 at the outer end of the hoist line 119. The disconnect 76 at the outer end of its extensible pressurized gas tube 75 is then applied to the inlet of the pneumatic motor driven winch 120 and the pressurized gas used to hoist up the line 119 together with the underwater power plant forming the subject of the present invention.

I claim:

1. Mobile underwater apparatus for operating an underwater pneumtic tool, wherein the invention comprises a submersible holder, a Dewar bottle carried by said holder and adapted to contain a body of liquefied gas, pressure buildup means actuated by heat derived from the water in which said holder is submerged for maintaining a pressurized gas head in said bottle above said body, means actuated by heat derived from the water in which said holder is submerged for vaporizing liquefied gas derived from said body, and means connecting said vaporizing means with said underwater pneumatic tool to operate the same.

2. Mobile underwater apparatus for operating an underwater pneumatic stool, wherein said invention comprises a submersible holder, a Dewar bottle carried by said holder and adapted to contain a body of liquefied gas, a first coil carried by said holder for heating the liquefied gas from said body to build up a pressurized gas head in said bottle and having its inlet connected with the bottom of said bottle and its outlet connected with the top thereof, a second coil carried by said holder for vaporizing the liquefied gas from said body having its inlet connected with the bottom of said bottle, and means connecting the outlet of said second heating coil with said underwater pneumatic tool to operate the same.

3. Mobile underwater apparatus as set forth in claim 2 additionally including a pneumatic motor mounted on said holder and a propeller driven by said motor and reacting against the water surrounding the submersed holder to assist in moving the submerged holder from plact to place.

4. Mobile underwater apparatus as set forth in claim 2 wherein said holder is in the form of a body forming chamber which is closed at its top and sides and open at its bottom to the water in which it is submerged, and valved means for conducting gas from one of said coils to said chamber to assist in surfacing the apparatus.

5. Mobile underwater apparatus as set forth in claim 4 additionally including means for blowing off gas from said chamber to submerge the apparatus and to bring it to neutral buoyancy, and means indicating the water level in said chamber thereby to indicate the degree of fill of said Dewar bottle with liquefied gas when the apparatus is at neutral buoyancy.

6. Mobile underwater apparatus as set forth in claim 2 wherein said holder is in the form of a body forming a chamber which is closed at its top and sides and open at its bottom to the water in which it is submerged, and wherein said coils are contained in the bottom of said chamber and immersed in the water contained therein.

7. Mobile underwater apparatus as set forth in claim 6 wherein said body is provided in a central part of its height with quick flooding ports to insure such immersion of said coils and to provide circulation of water therearound.

8. Apparatus as set forth in claim 2 wherein said tool comprises a tube having an open upper submerged end with said means connecting the outlet of said second heating coil being arranged to discharge into the bottom of said tube, thereby to create suction in the bottom of said tube.

9. Apparatus as set forth in claim 8 wherein said tool additionally includes a suction disk having a soft, resilient sealing rim projecting perpendicularly from its suction side and a valved conduit connecting the suction side of said disk with the bottom of said tube whereby upon placing the suction side and sealing rim of said suction disk against a submerged surface, and rendering said conduit operative, said suction disk is firmly adhered to said surface to provide an anchor for use by the diver.

10. Apparatus as set forth in claim 8 wherein said tube is provided with a bottom opening of sufficient size to draw a quantity of mud, stones and the like from the bottom of the body of water in which it is submerged, said mud and stones being discharged with water and gas from the upper end of said tube.

11. Apparatus as set forth in claim 10 wherein said tube is in the form of a straight tube capable of working down into said bottom of the body of water to form a pile.

12. Apparatus as set forth in claim 2 additionally having a ballast weight detachably secured to said holder.

References Cited

UNITED STATES PATENTS

| 2,519,453 | 8/1950 | Goodman | 61—69 |
| 3,062,002 | 11/1962 | Shaffer | 114—16 X |
| 3,298,176 | 1/1967 | Forsyth et al. | 114—16 X |
| 3,302,401 | 2/1967 | Rockerfeller | 114—16 X |
| 3,418,818 | 12/1968 | Vincent et al. | 61—69 |

DAVID J. WILLIAMOWSKY, Primary Examiner

J. K. BELL, Assistant Examiner

U.S. Cl. X.R.

114—16